(12) United States Patent
Al-Qaffas

(10) Patent No.: US 8,640,381 B2
(45) Date of Patent: Feb. 4, 2014

(54) FLYING INSECT TRAP

(76) Inventor: Qasem A. Al-Qaffas, Alsalam (KW)

( * ) Notice: Subject to any disclaimer, the term of this patent is extended or adjusted under 35 U.S.C. 154(b) by 219 days.

(21) Appl. No.: 12/897,101

(22) Filed: Oct. 4, 2010

(65) Prior Publication Data

US 2012/0079759 A1    Apr. 5, 2012

(51) Int. Cl.
*A01M 1/06* (2006.01)
*A01M 1/14* (2006.01)

(52) U.S. Cl.
USPC .............................................. 43/139; 43/114

(58) Field of Classification Search
USPC ...................................................... 43/139, 114
See application file for complete search history.

(56) References Cited

U.S. PATENT DOCUMENTS

| | | | | |
|---|---|---|---|---|
| 289,997 A * | 12/1883 | De Luze | | 43/139 |
| 454,720 A * | 6/1891 | Dexter | | 43/139 |
| 1,141,039 A * | 5/1915 | Cox | | 43/139 |
| 1,308,497 A * | 7/1919 | Jolly | | 43/139 |
| 1,797,557 A * | 3/1931 | Stine et al. | | 43/139 |
| 2,992,770 A * | 7/1961 | Keiser | | 43/139 |
| 3,330,063 A * | 7/1967 | Lockwood | | 43/139 |
| 3,711,987 A * | 1/1973 | Fisk | | 43/139 |
| 3,965,608 A * | 6/1976 | Schuman | | 43/139 |
| 4,074,458 A * | 2/1978 | Catlett | | 43/139 |
| 4,175,352 A * | 11/1979 | Catlett | | 43/139 |
| 4,279,095 A * | 7/1981 | Aasen | | 43/139 |
| 4,282,673 A * | 8/1981 | Focks et al. | | 43/139 |
| 4,488,331 A * | 12/1984 | Ward | | 43/139 |
| 4,607,451 A * | 8/1986 | Jarecki | | 43/139 |
| 4,733,495 A * | 3/1988 | Winnicki | | 43/139 |
| 4,817,330 A * | 4/1989 | Fahringer | | 43/139 |
| 4,856,226 A * | 8/1989 | Taylor | | 43/113 |
| 4,918,857 A * | 4/1990 | Wade et al. | | 43/139 |
| 4,979,330 A * | 12/1990 | Rorant | | 43/139 |
| 5,175,960 A * | 1/1993 | Wade et al. | | 43/139 |
| 5,305,495 A * | 4/1994 | Nelsen et al. | | 43/139 |
| 5,402,598 A * | 4/1995 | Wade et al. | | 43/139 |
| 5,915,950 A * | 6/1999 | Kleinhenz | | 43/139 |
| 6,202,343 B1 * | 3/2001 | Mah | | 43/139 |
| 6,226,919 B1 * | 5/2001 | Septer | | 43/139 |
| 6,651,380 B2 * | 11/2003 | Wyers | | 43/139 |
| 7,152,365 B2 * | 12/2006 | Wyers | | 43/139 |
| 7,404,269 B2 * | 7/2008 | Collins | | 43/139 |
| 2005/0246945 A1 * | 11/2005 | Evink | | 43/139 |

FOREIGN PATENT DOCUMENTS

| | | | | |
|---|---|---|---|---|
| DE | 4112266 C1 * | 5/1992 | | A01M 1/06 |
| DE | 4327150 A1 * | 2/1995 | | A01M 1/06 |
| DE | 19522707 A1 * | 1/1997 | | A01M 1/06 |
| EP | 129504 A1 * | 12/1984 | | A01M 1/06 |

(Continued)

*Primary Examiner* — Darren W Ark
(74) *Attorney, Agent, or Firm* — Lowe Hauptman & Ham, LLP

(57) ABSTRACT

A manually operable flying insect trap includes an elongated hollow cylindrical body having two generally closed ends and a small orifice in each of the ends. A vacuum device including a bellows, first and second ends of an intermediate pleated portion. The bellows also has a compressed state and an expanded state and is disposed adjacent a first of the opposite ends of the body with a small opening adjacent to and in communication with the small orifice in the first of the opposite ends. The funnel shape trap portion is also provided with a small orifice in the narrow portion thereof, a cone shaped piece of fly paper is attached to the inside of the tunnel shaped trap. Finally, a manually activatible mechanism is provided for expanding the bellows to draw air into or out of the body.

1 Claim, 2 Drawing Sheets

(56) References Cited

FOREIGN PATENT DOCUMENTS

| | | | | |
|---|---|---|---|---|
| EP | 1040756 A1 | * | 10/2000 | .............. A01M 1/06 |
| GB | 2351645 A | * | 1/2001 | .............. A01M 1/06 |
| JP | 2003169583 A | * | 6/2003 | .............. A01M 1/06 |
| JP | 2004057076 A | * | 2/2004 | .............. A01M 1/06 |
| JP | 2008263875 A | * | 11/2008 | .............. A01M 1/06 |

* cited by examiner

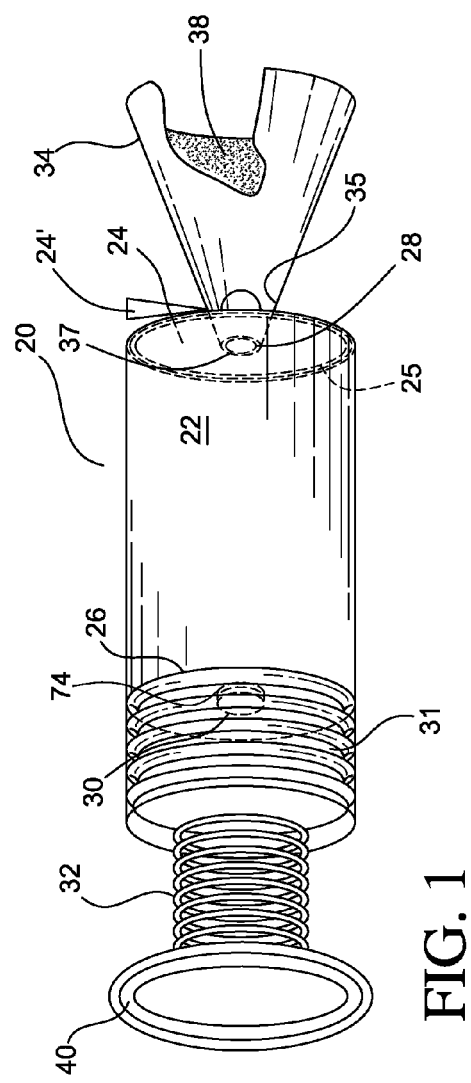
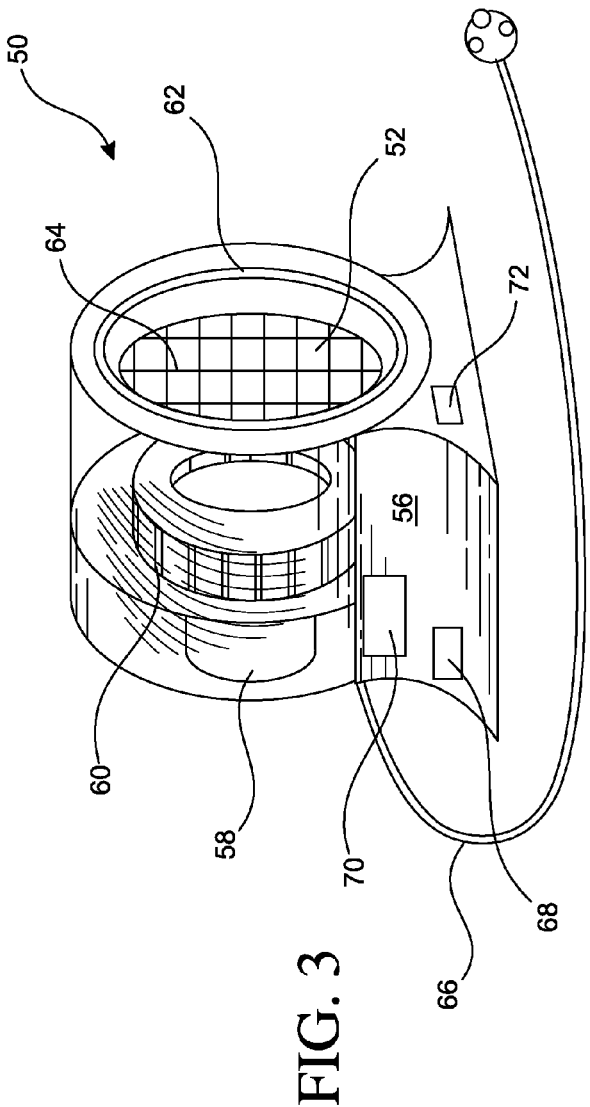
FIG. 1
FIG. 3

FLYING INSECT TRAP

FIELD OF THE INVENTION

This invention relates to a flying insect trap and more particularly to a hand operated vacuum assisted flying insect trap.

BACKGROUND FOR THE INVENTION

Flying insect traps are well known and have been in use for many years. For example a flying insect trap is disclosed in a U.S. Pat. No. 4,282,673 of Focks et al. As disclosed, a device for trapping live flying insects, such as mosquitoes includes an electric light reflected by a parabolic reflector horizontally in all directions to attract the mosquitoes. An electric fan is used to blow the mosquitoes downwardly into a collection bag, and a valve between the fan and the collection bag is biased to close the entrance of the collection bag when the fan is not operating and to be opened by the force of air from the fan when it is operating.

A more recent patent on a portable electric vacuum wired to terminate and dispose of pests is disclosed in a U.S. Pat. No. 6,202,343 of Mah. As disclosed, a dedicated, vacuum operated, electrical capture device has a shaped capture housing having an inner rim carrying conductors for killing or stunning a pest, to cause the pest to release itself from its position on a surface, and a vacuum suction motor assembly to pull the pest through a telescoping section to a final section of tubing which is accessible to facilitate disposal of the pest. A pest collection compartment situated along the air intake tube includes a flexible door for convenient disposal of the collected insects. The pest collection compartment preferably contains a transparent section so that the user can know when the pest has been withdrawn into the device. The transparent window also allows an individual to know that the pests is dead and that the user can dispose of the pests preferably without touching it.

Finally, a U.S. Patent of Collins, U.S. Pat. No. 7,404,269 discloses an insect collector and viewer. The insect collection and viewing device disclosed therein comprises a negative air pressure generating assembly including a motor and a fan driven by the motor and a suitably shaped collection nozzle. A viewing chamber is coupled immediate the collection nozzle and the negative air pressure assembly. The viewing chamber is tubular in shape and has an air permeable insect impermeable screen at the downstream opening thereof and a moveable valve/lens at the upstream opening thereof. When the valve/lens is open an airflow is established through the device. The airflow path is from the nozzle through the viewing chamber into and out of the assembly. In operation, insects of interest are captured by sucking the insect into the device through the nozzle, then through the open valve/lens into the viewing chamber where it is captured between the screen and the closed valve. By making the valve in the shape of a transparent lens the trapped inset may be inspected through the magnifying lens.

Notwithstanding the above, it is presently believed that there is a need and a potential commercial market for an improved flying insect trap in accordance with the present invention. There should be a need and a potential commercial market for a flying insect trap in accordance with a first embodiment of the present invention because it is manually operable and does not require batteries or a connection to an electrical outlet. Further, the devices in accordance with the first embodiment of the invention can be manufactured and sold at a reasonable cost, are relatively compact, of simple design, rugged, easily serviced and easily used and emptied of dead insects.

Further, a flying insect trap in accordance with a second embodiment of the invention is electrically or battery powered, efficient to use and capable of capturing and killing a relatively large volume of insects with a relatively low amount of electricity. Such traps are also relatively rugged, easily serviced and is believed capable of being manufactured and sold at a reasonable cost. In this embodiment dead insects can also be readily disposed of quickly and cleanly.

BRIEF SUMMARY OF THE INVENTION

In essence a manually operative flying insect trap comprises an elongated hollow cylindrical body including two generally closed ends and a small centered orifice in each of the generally closed ends. A vacuum device includes a bellows having first and second ends and an intermittent pleated expansion part. The bellows having a compressed state and expanding state is disposed adjacent a first of the opposite ends of the elongated hollow cylindrical body and includes a small opening adjacent to and in communication with the small orifice in the first of the opposite ends of the elongated hollow cylindrical body.

A funnel shaped trap portion has a small opening adjacent to and in communication with the small orifice in the second generally closed end of the elongated hollow cylindrical body. In addition, a cone shaped piece of fly paper having a sticky side and attachment side is fixed to the inside of the funnel shaped trap with the sticky side exposed. Further, a manually activatable means for expanding the bellows from its compressed state to a expanded state to thereby draw air through a funnel shaped trap, the second essentially closed end and the elongated hollow cylindrical body to thereby entrap flying insects on the sticky side of the fly paper or into the elongated hollow cylindrical body. Further, one end of the one essentially closed end of the elongated hollow cylindrical body is openable to dispose of the remains of the insects.

The invention will now be described in connection with the accompanying drawing wherein like reference numerals have been used to indicate like parts.

DESCRIPTION OF THE DRAWINGS

FIG. 1 is a schematic illustration of a fly trap in accordance with the first embodiment of the invention;

FIG. 3 is a schematic illustration of a flying insect trap in accordance with a second embodiment of the invention.

DESCRIPTION OF THE PREFERRED EMBODIMENTS OF THE INVENTION

Figure 2:
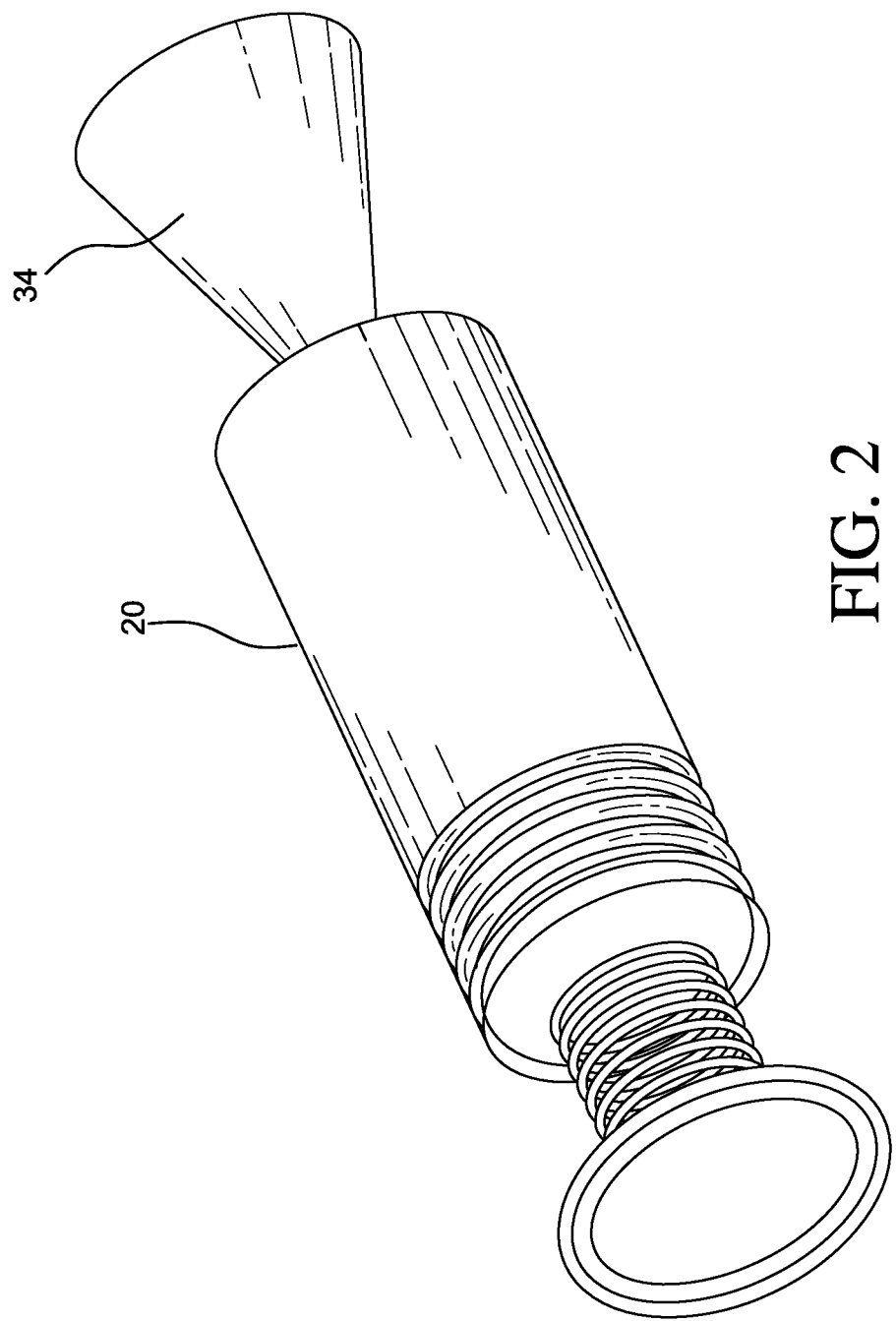
FIG. 2 is a schematic illustration partly exploded of the fly trap shown in FIG. 1.

As illustrated in FIGS. 1-2 a manually operable flying insect trap 20 in accordance with a first embodiment of the invention includes an elongated hollow cylindrically shaped housing or body 22 having a first essentially closed but may be removable end 24 and a second essentially closed but removable end 26. Each of the ends 24 and 26 includes a small orifice 28 and 30 respectfully in a center portion of the closed ends 24 and 26. The first end 24 also includes a valve 24' that provides a means for opening and closing the first end 24 to either allow or prevent air to be drawn into the body 22. Either closed end portion may include a removable seal 25 (shown with respect to the closed end 24 for sealing the body 22 by closing the orifice 28 in the first end 24).

A spring biased vacuum device 32 at the second end 26 includes a bellows 31 for creating a vacuum in the elongated hollow cylindrical housing or body 22 and/or for drawing air into the body 22 through the small orifice 28 and 30 when the bellows 31 is opened or expanded from a compressed state to an expanded state.

The flying insect trap 20 also includes a funnel or frusto-conical shaped trap portion 34 with the smaller portion 35 therein disposed adjacent to the essentially closed but removable end portion 24 with an orfice 28 superimposed on a second orifice 37. The funnel or frusto-conical shaped trap portion 34 includes a frusto-conical shaped piece of glue paper or fly paper 38 removeably fixed to an interior surface of the trap portion 34. Glue paper or fly paper is a fly killing device made of paper coated with a sweetly fragrant, extremely sticky substance that traps flies and other flying insects. Suitable fly paper is available through normal commercial sources but are also available from ACE Hardware over the internet and as identified as TAT fly paper.

As illustrated in FIG. 1, the flying insect trap 20 includes a spring biased member or ring shaped member 40, spring 32 and valve 74 for expanding and collapsing or closing the bellows 31 that can also be used to force air through the body 22 before removal of the removable end 24. The valve 74 allows air to be exhausted from the bellows 31 when compressing the bellows without allowing air back through the body 22.

A second embodiment of the invention is illustrated in FIG. 3. As shown, an electric powered flying insect trap 50 includes an annular opening 52 having an annular and preferably circular blue light 54 surrounding the opening 52 and a hollow base 56 that is open on the upper portion thereof is adapted to receive insects that have been killed and fall down into the hollow base 56. The electric motor 58 is disposed above the base 56 in a rear portion of the trap 50 for rotating a turbine fan 60.

An important feature in the second embodiment of the invention resides a sensor 62 for sensing insects in the vicinity of the opening 52. The sensor 62 may be sound activated or involve the use of a light beam or curtain of light and means for detecting insects flying through the beam or curtain of light as disclosed in a U.S. Patent of Gardner, Jr. et al., U.S. Pat. No. 7,071,829 which is incorporated in its entirety by reference. In this embodiment of the invention, when an insect or insects are detected the motor 58 is energized to rotate the fan 60 to draw the insects through the opening 52 and into contact with an electrically charged grid 64 that kills the insects and allows the body to fall down into the housing 56.

As illustrated in FIG. 3, it is contemplated that the motor is connected to an electrical outlet by an electrical cord 66 and plug or by a battery pack 68. It is also contemplated that the battery pack 68 can be recharged by a solar panel 70.

The electrical discharge insect control system or trap 50 may include an event monitoring or detection circuit (not shown). The trap 50 kills insects by discharging electricity from a transformer 72 through the insect when it approaches or comes into contact with the electrified grid 64. The insect reduces the air gap between the electrodes of the grid allowing breakdown to occur in the air and electric current to flow through the insect in a conventional manner. The current flows during a short period of time in which the insect is in the vicinity of the grid and kills the insect.

The trap 50 includes a sensing circuit to monitor for insects (e.g. when an insect enters opening 52). When the current flows the circuit detects a transient signal as the system is activated and feeds the signal to a counter and microprocessor. This data is then transmitted by a communication device. Feedback information may also be fed to a communication device.

While the invention has been described in connection with its preferred embodiment it should be recognized that changes and modifications may be made therein without departing from the scope of the appended claims.

What is claimed is:

1. A manually operative insect trap consisting of:

an elongated hollow cylindrical body including a first and a second generally closed ends and a small orifice centered in each of said first and a second generally closed end;

in which one of said first and a second generally closed end is removable from said elongated hollow cylindrical body and which includes means for sealing said body by closing said orifice in said first generally closed end and means for opening and closing said first generally closed end to either allow or prevent the drawing of air into said body;

a vacuum device including a spring, a ring-shaped member and a spring biased bellows disposed between said spring and said elongated cylindrical body, said bellows having first and second ends and an internal pleated expansion part and said bellows having a compressed state and an expanding state and being disposed adjacent said second generally closed end of said elongated hollow cylindrical body and a first end of said bellows defining an opening adjacent to said elongated hollow cylindrical body and in communication with said small orfice in said first generally closed end and in which said vacuum device includes a valve for allowing air to be exhausted from said bellows when compressing said bellows without allowing air back through said enlongated hollow cylindrical body;

a frusto-conical shaped trap portion having a small opening adjacent and in communication with a small orifice in said second generally closed end of said elongated hollow cylindrical body;

a cone shaped piece of fly paper having a sticky side and an attachment side adjacent to an inside of said frusto-conical shaped trap portion;

said ring-shaped member being manually activatible for expanding said bellows from said compressed state to said expanded state to thereby draw air through said frusto-conical shaped trap portion, said orifice in said first generally closed end and said elongated hollow cylindrical body and entrap flying insects on said sticky side of said fly paper and in said elongated hollow cylindrical body.

* * * * *